US005084963A

United States Patent [19]

Murray et al.

[11] Patent Number: 5,084,963

[45] Date of Patent: Feb. 4, 1992

[54] PRECONNECTION DEFORMING DIE AND METHOD OF CONNECTING A GROUNDING ROD WITH AN ELECTRICAL CABLE

[75] Inventors: Thomas C. Murray, Aurora; Kevin J. Flynn, Burlington, both of Canada

[73] Assignee: Burndy Corporation, Norwalk, Conn.

[21] Appl. No.: 589,872

[22] Filed: Sep. 28, 1990

[51] Int. Cl.[5] .................... H01R 43/042; B21D 37/00; B23P 11/00

[52] U.S. Cl. .......................................... 29/863; 29/517; 29/237; 29/751; 72/416; 72/453.16; 403/283; 174/7; 174/94 R

[58] Field of Search ................. 72/416, 412, 410, 409, 72/453.16, 453.15, 407; 29/517, 863, 865, 751, 753, 237; 403/283, 284, 274; 81/426, 426.5; 174/7, 94 R

[56] References Cited

U.S. PATENT DOCUMENTS

| | | | |
|---|---|---|---|
| 471,129 | 3/1892 | Loveland et al. | 78/15 |
| 601,230 | 3/1898 | Partridge | 72/409 |
| 1,001,054 | 8/1911 | Lawrence | 174/7 |
| 1,652,835 | 12/1927 | Peirce | 29/517 |
| 1,823,158 | 9/1931 | Mogford | 29/517 |
| 2,035,686 | 3/1936 | Briegel | 29/517 |
| 2,291,803 | 8/1942 | Grotnes | 78/15 |
| 2,382,359 | 8/1945 | Weightman | 78/15 |
| 3,332,272 | 7/1967 | Tonchen | 72/410 |
| 3,481,373 | 12/1969 | Blagojevich | 140/113 |
| 3,487,524 | 1/1970 | Filia | 29/203 |
| 3,523,351 | 8/1970 | Filia | 29/203 |
| 3,577,622 | 5/1971 | Shaffer | 29/751 |
| 3,737,975 | 6/1973 | McKinnon | 174/94 R |
| 3,783,487 | 1/1974 | May | 29/753 |
| 3,792,603 | 2/1974 | Orain | 72/410 |
| 3,823,462 | 7/1974 | Kanda | 29/268 |
| 3,872,578 | 3/1975 | Ullom | 29/525 |
| 3,916,517 | 11/1975 | Luongo | 174/94 R |
| 3,931,726 | 1/1976 | Grubb | 29/753 |
| 4,829,654 | 5/1989 | Hangebrauck | 29/508 |
| 5,007,280 | 4/1991 | Quinn | 29/237 |

FOREIGN PATENT DOCUMENTS

| | | | |
|---|---|---|---|
| 713028 | 10/1931 | France | 174/7 |
| 1405373 | 9/1975 | United Kingdom | 72/416 |

*Primary Examiner*—Daniel C. Crane
*Attorney, Agent, or Firm*—Perman & Green

[57] ABSTRACT

A die and method for forming indentations in a grounding rod. The die is a U-shaped die for use in a hydraulic compression tool. The die has an inner face forming a general recess and has a plurality of series of individual tooth-like projections. The die is used to form a plurality of series of individual tooth-like indentations on an exterior surface of the grounding rod such that a connector can be compressed onto the rod with portions of the connector being deformed into the indentations to fixedly connect the connector to the rod.

15 Claims, 1 Drawing Sheet

PRECONNECTION DEFORMING DIE AND METHOD OF CONNECTING A GROUNDING ROD WITH AN ELECTRICAL CABLE

BACKGROUND OF THE INVENTION

1. Field of the Invention

The present invention relates to metal deforming dies and, more particularly, to a die for preparing a member for connection of a connector and a method of connecting two members together.

2. Prior Art

Deformable metal connectors have been used in the past to connect electrical cables with metal grounding rods. One type of grounding rods are generally comprised of solid metal with a smooth exterior. The connector is usually placed over the rod and compressed or crimped by a tool such as a hydraulic compression tool to secure the connector onto the rod. The connector is likewise crimped with the electrical cable such that an electrical and mechanical connection is made between the rod and the cable.

In the past, there have been reported cases of connectors slipping on the grounding rods after installation. The occurrences of connector slippage were usually reported where significant vibrations from electric and pneumatic hammers resulted in loosening of the compressive crimp of the compressed connectors. Loosening of the compressed connector from the grounding rod could allow for complete failure of the mechanical connection. Thus, some compression type connectors needed to be recrimped, replaced, or not used in favor of more expensive alternate types of connectors.

It is therefore an objective of the present invention to overcome the disadvantages in the prior art as well as provide additional features.

SUMMARY OF THE INVENTION

The foregoing problems are overcome and other advantages are provided by a die for use in a hydraulic compression tool for deforming a grounding rod to make an interlocking connection with a compression connector and a method of connecting a grounding rod with an electrical cable.

In accordance with one embodiment of the invention a U-shaped indenting die is provided for use with a cooperating die in a hydraulic compression tool for forming indentations in a grounding rod. The die has an outer face suitably sized and shaped to be received in a jaw of a hydraulic compression tool. The die also has an inner face forming a general recess and having a plurality of series of individual tooth-like projections projecting into the recess such that the grounding rod can be indented by the die to form a plurality of series of individual tooth-like indentations on an exterior surface of the rod and a connector can be compressed onto the rod with portions of the connector being deformed into the individual indentations in each series to fixedly connect the connector to the rod.

In accordance with one method of the invention, a method is provided of forming a mechanical and electrical connection between a grounding rod and an electrical cable. The method comprises indenting an exterior surface of the rod to form tooth-like indentations; positioning a connector over the rod at the indentations; and compressing the connector onto the rod at the indentations, the connector deforming, at least partially, into the indentations to thereby provide an interlocking engagement between the connector and the rod.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
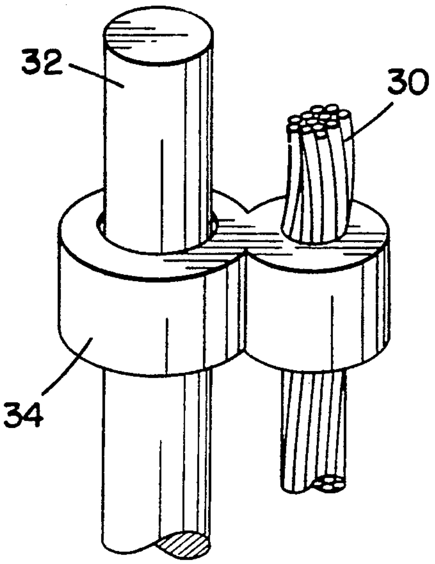
FIG. 1 is a perspective view of a connector electrically and mechanically connecting a grounding rod with an electrical cable.
Figure 3:
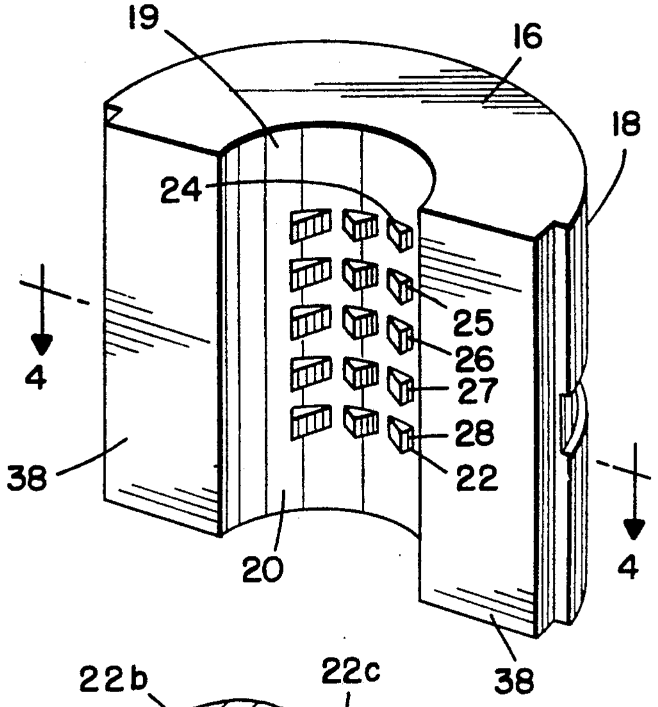
FIG. 3 is a perspective view of a die incorporating features of the present invention intended for use in the crimper shown in FIG. 2.
Figure 4:
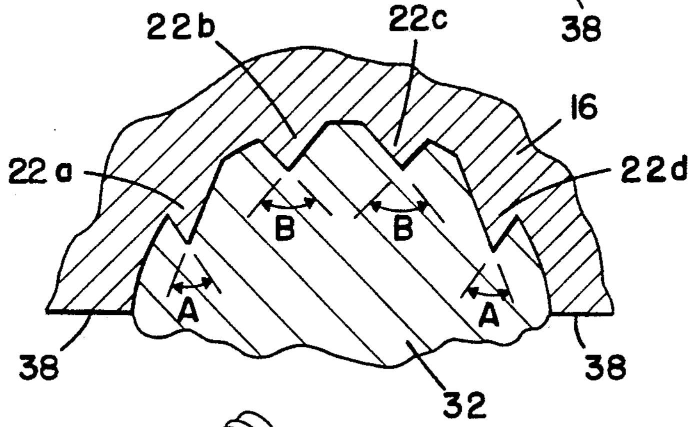
FIG. 4 is a partial cross-sectional view of a grounding bar deformed by the die shown in FIG. 3 taken along line 4—4.
Figure 2:
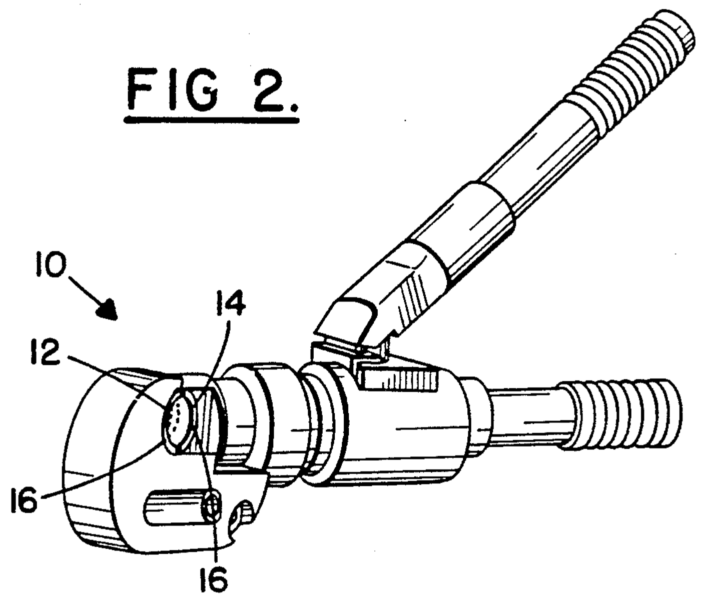
FIG. 2 is a perspective view of a hand held hydraulic crimper known in the prior art.

Referring to the various figures, the hand held hydraulic crimper 10 is of the type having upper and lower jaws for receiving crimping dies such as disclosed in U.S. Pat. Nos. 4,942,757 and 4,947,672 which are hereby incorporated by reference in their entirety herein. Although the crimper 10 is normally used to crimp connectors onto members such as cables and the like, in the embodiment shown, the "U" crimping dies have been replaced with two grounding bar deforming dies 16. The two deforming dies 16 are substantially minor images of each other and are adapted to be received into the upper and lower jaws 12 and 14 of the crimper 10. Each of the dies 16 is comprised of metal, such as hardened steel, and has a general semi-tubular shape with a curved exterior wall 18 and a recess 19 that is generally U-shaped with a curved interior wall 20. Located on the interior wall 20 are a plurality of series of tooth-like projections 22. In the embodiment shown, each die 16 has five series or rows 24, 25, 26, 27, 28 of projections 22 with each row being identical to each other and having four projections each. However, any suitable number or configuration of series of projections may be provided.

Figure 5:
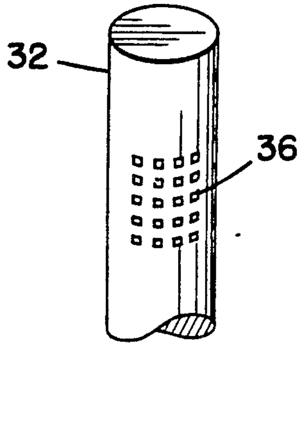
FIG. 5 is a perspective view of the grounding bar shown in FIG. 4 after having been deformed by the die shown in FIG. 3.

As shown in FIG. 1, in order to electrically and mechanically connect the electrical cable 30 to the grounding rod or bar 32, a connecter 34 is used. The connector 34 is generally comprised of a deformable electrically conductive material such as copper and can be deformed or crimped onto the cable 30 and rod 32. However, as noted above, in the post, due to vibrations and the like, and the fact that the rod 32 has a generally smooth exterior, connectors could slip on the grounding rod. The present invention uses the crimper 10 and deforming dies 16 to pre-deform the grounding rod 32 prior to crimping of the connector 34 thereon. The pre-deformation of the rod 32 by the projections 22 of the die 16 forms indentations 36 as generally illustrated in FIG. 5. Before crimping or compressing the connector 34 to the grounding rod 32, the crimper 10 has the dies 16 inserted into the jaws 12 and 14. The jaws 12 and 14 are linearly moved relative to each other by pumping the handles of the crimper 10. The dies 16 capture the circumference of the grounding rod 32 with its teeth 22.

Upon further pumping of the crimper handles, pressure is applied to further move the dies 16 towards each other to press the teeth into the rod 32 and form indentations 36. Once the indentations 36 are formed in the rod 32, the crimper 10 is removed. The dies 16 are then removed from the crimper 1.. The connector 34 can then be positioned on the rod 32 over the indentations 36. The operator installs crimping dies (not shown) into jaws 12 and 14 of the crimper 10 and then crimps or compresses the connector 34 onto the rod 32. As the connector 34 is compressed, it deforms round the rod 32 and, due to the presence of the indentations or voids in the rod 32, deforms, at least partially, into the indentations 36 to provide an interlocking fit between the connector 34 and the rod 32. The cable 30 can then also be inserted into the connector 34 can crimped thereto. Of course, the cable 30 could be crimped to the connector prior to connection of the connector 34 to the bar 32. In addition, any suitable type of connector could be used. Any suitable type of compression tool could also be used. In addition, two deformation dies 16 may not be necessary. One or more than two deforming dies may be used. The deforming dies 16 may also be provided with any suitable size, shape and type of materials.

In the embodiment shown, the teeth or protrusions 22 and interior wall 20 have been designed for a particular sized rod 32. In each series of teeth, in the embodiment shown, there are two sets of two teeth each that are mirror images of each other. Each set has an exterior tooth **22*a* and 22*d* having a triangular shape with about a 60 degree apex angle A and, an interior tooth 22*b* and 22*c* having a triangular shape with about a 90 degree apex angle B. Each tooth is angled in a direction generally perpendicular to a meeting face 38 of the dies 16. In the embodiment shown, each tooth 22 is generally triangular or pyramid shaped. Also in the embodiment shown, the teeth 22 are about 30 degrees apart on the curved interior wall 20**. However, any suitable sized and shaped teeth could be provided and at any suitable orientation to each other.

From the above description the features and advantages of the present invention should be readily understood. Unlike in the prior art, the added step of first pre-deforming the grounding bar 32 before crimping the connector 34 onto the bar virtually eliminates any risk of the connector slipping on the bar. Since the deforming dies 16 can be used with the crimper 10, no additional tooling other than the dies 16 need be provided. In order to get good penetration of the bar 32 by the teeth 22, the teeth are orientated generally in the direction of the path of relative movement of the dies towards each other. Thus, even though the bar 32 has a curved outer perimeter and the dies 16 only have a relative linear motion towards each other, the positioning of the teeth 22 on the curved interior wall 20 and their orientation allow the proper formation of indentations 36 to receive deformed portions of the connector that flow into the indentations and thereby interlock the connector with the bar to prevent slipage.

Let it be understood that the the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

We claim:

1. A method of forming a mechanical and electrical connection between a grounding rod and an electrical cable, the method comprising:

indenting an exterior surface of the rod by use of a hydraulic compression tool having U-shaped dies with tooth-like protuberances to form tooth-like indentations on the rod exterior surface, the tooth-like protuberances having at least two different types of protuberances of dissimilar shapes to form different types of tooth-like indentations; positioning a connector over the rod at the indentations; and compressing the connector onto the rod at the indentations, the connector deforming, at least partially, into the different types of tooth-like indentations to thereby provide an interlocking engagement between the connector and the rod.

2. A method as in claim 1 further comprising connecting the cable to the connector.

3. A method as in claim 1 wherein the step of compressing the connector onto the rod comprises crimping the connector with a hydraulic compression tool.

4. A method as in claim 1 wherein the step of indenting the exterior surface of the rod forms a plurality of series of individual tooth-like projections.

5. A method as in claim 1 wherein the method uses two U-shaped dies that are moved towards each other and their protuberances are angled at a direction generally perpendicular to a meeting plane of the dies such that the dies can form the indentations in the rod without substantial risk of the protuberances being broken by the compression.

6. A U-shaped indenting die for use with a cooperating die in a hydraulic compression tool for forming indentations in a grounding rod, the die comprising:

an outer face suitably sized and shaped to be received in a jaw of the hydraulic compression tool; and an inner face forming a general recess and forming the U-shape configuration of the indenting die and having a plurality of series of individual tooth-like projections projecting into the recess, the projections including at least two different types of projections of dissimilar shapes, such that the grounding rod can be indented by the die to form a plurality of series of individual tooth-like indentations of dissimilar shapes on an exterior surface of the rod and a connector can be compressed onto the rod with portions of the connector being deformed into the individual indentations in each series to fixedly connect the connector to the rod.

7. An indenting die as in claim 6 wherein at least one series of projections is comprised of four projections.

8. An indenting die as in claim 6 wherein the inner face is symmetric about a center axis of the die.

9. An indenting die as in claim 6 wherein the protuberances are angled at a direction perpendicular to a meeting face of the die intended to meet with the cooperating die.

10. An indenting die as in claim 6 wherein the recess is generally U-shaped.

11. An indenting die as in claim 6 wherein the projections are relatively triangular shaped.

12. An indenting die as in claim 11 wherein the projections of each series are comprised of at least two different type sized and shaped triangular projections.

13. An indenting die as in claim 12 wherein at least one of the types of projections has about a 90 degree angle at an apex between sides of the triangular projections.

14. An indenting die as in claim 12 wherein at least one of the types of projections has about a 60 degree angle at an apex between sides of the triangular projections.

15. An indenting die as in claim 7 wherein the projections are generally located relative to each other in each series at about 30 degree angular spacings.

* * * * *